Dec. 24, 1968   S. LEPTRONE   3,417,873
FOOD DISPENSING RACK

Filed May 18, 1966   2 Sheets-Sheet 1

INVENTOR
SAMUEL LEPTRONE

BY          ATTORNEY

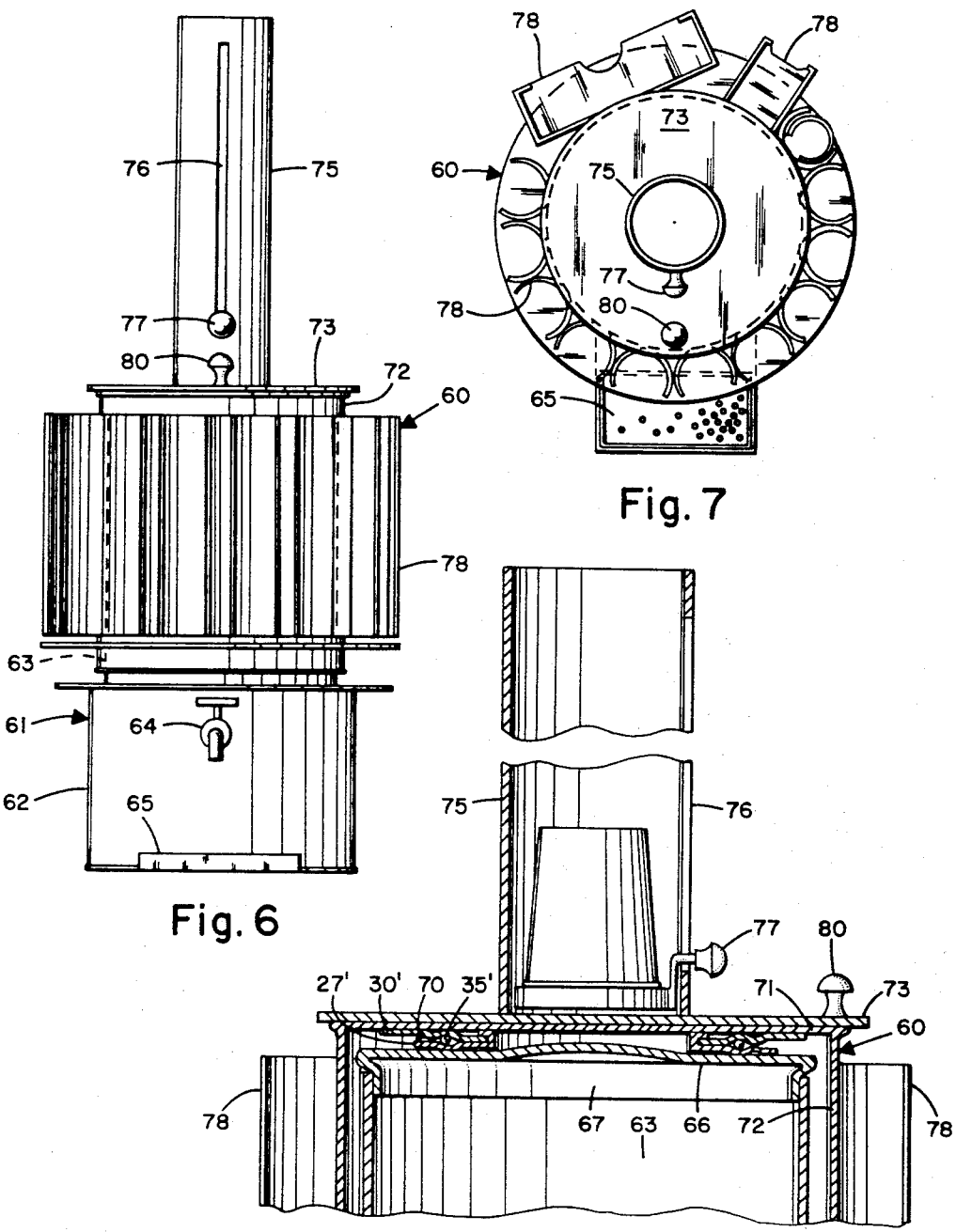

United States Patent Office 3,417,873
Patented Dec. 24, 1968

3,417,873
FOOD DISPENSING RACK
Samuel Leptrone, 1731 Robinhood Lane,
Clearwater, Fla. 33516
Filed May 18, 1966, Ser. No. 551,073
3 Claims. (Cl. 211—77)

ABSTRACT OF THE DISCLOSURE

A dispenser for hot water is shown comprising an upright water container structure having a rack rotatably supported on the top thereof, which rack includes first and second top plates, the first plate being centered across the top of the container structure and the second plate being rotatably supported on the first plate and having a depending skirt member extending downwardly from the edges thereof and alongside the container structure, the skirt having rack means projecting therefrom for supporting supplies for the making and consuming of liquid refreshments and foods. In one form of the invention an aperture is provided in one side of the skirt by which access may be had to a valve in the side of the container. In another form of the invention the first plate comprises a lid for the open top of the container structure.

---

The present invention relates to dispensing racks for storage of food, beverage concentrates, and articles employed in the preparation and consumption of so-called "instant" beverages and food and which racks can be conveniently attached to more or less conventional portable water heating devices.

It has become common practice for offices, hotels and the like to provide hot water supply devices which can be conveniently used to prepare individual beverages and food servings formed by mixing concentrates with hot water. It is a problem to provide suitable storage facilities for the ingredients for the servings as well as cups, mixing spoons, napkins, etc. which are incidental to the preparation and consumption of the food or beverage.

The principal object of the present invention is the provision of a new and improved rack for use with hot water dispensing devices of the type mentioned which can be readily applied to such devices to provide convenient storage of articles and food and beverage concentrates used with hot water to prepare individual servings, the rack preferably being rotatable about the central axis of the water dispensing device to provide a compact item storage facilitiy in which the items stored can be readily selected for preparation of the servings.

Other objects and advantages of the invention will be apparent from the following description of preferred forms thereof, reference being made to the accompanying drawings wherein:

FIG. 6 is a front elevational view of a second form of food dispensing rack shown supported on a conventional coffee urn type of water heater;

FIG. 7 is a plan view in elevation of the food dispensing rack and hot water device shown in FIG. 6; and FIG. 8 is a fragmentary, vertical sectional view of the food rack and water heating device shown in FIG. 6 and drawn on a larger scale.

Figure 1:
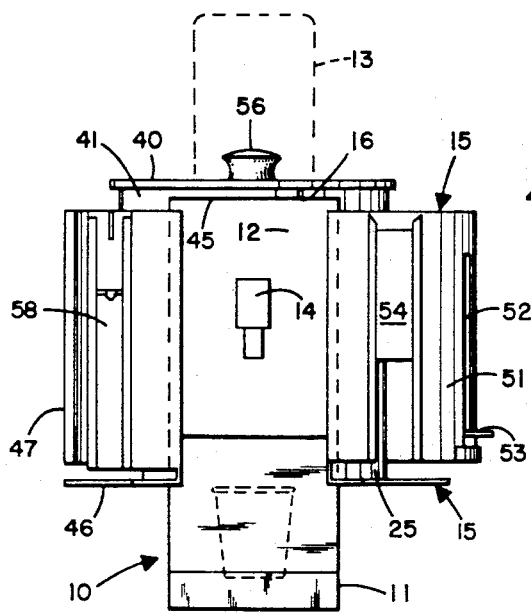
FIG. 1 is a front elevational view of a hot water dispensing device having a food dispensing rack embodying the invention supported thereon.
Figure 2:
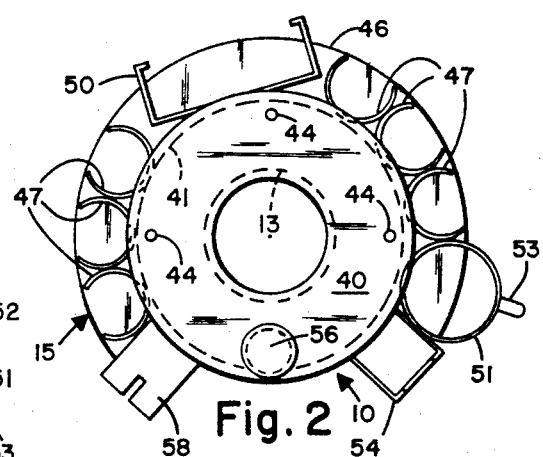
FIG. 2 is a plan view in elevation of the water heating device and rack shown in FIG. 1.
Figure 4:
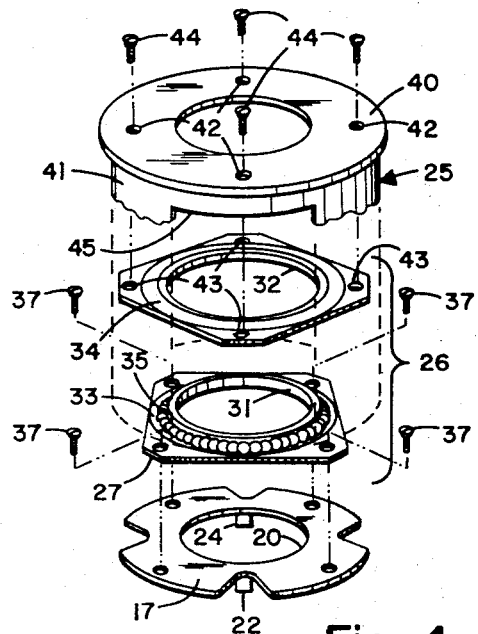
FIG. 4 is a fragmentary exploded view of certain parts of the food dispensing rack shown in FIGS. 1 and 2.
Figure 3:
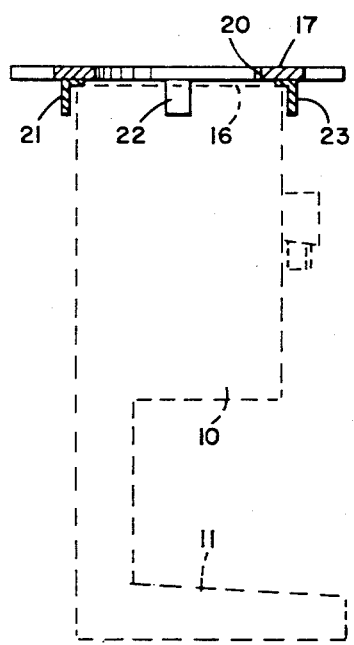
FIG. 3 is a fragmentary sectional view of a part of the food dispensing rack shown positioned on the water heating device.
Figure 5:
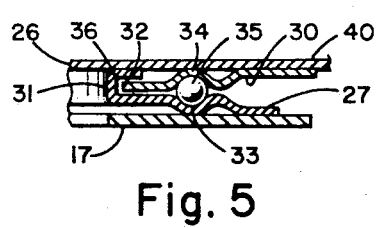
FIG. 5 is a fragmentary view of a part of a bearing structure shown in FIG. 4 and on a larger scale.

Referring to FIGS. 1 through 5, a device 10 is shown in broken lines for dispensing hot water which may be used to prepare individual servings of so-called "instant" coffee, hot chocolate, tea, soups, bouillons, etc. which are prepared by mixing a concentrate, generally in a dry powdered form, in hot water placed in a cup or the like. The device 10 is of a well known type which utilizes electric power to heat the water and it may be portable or attached to a suitable support, not shown. The device 10 includes a base 11 having a body 12 supported thereon which includes a water container and electric heating elements, not shown, arranged to heat water supplied to the container from an inverted bottle 13 supported on the top of the water heating device and emptying into the container. The heated water is dispensed through a valve 14 at the front of the body 12. The top wall 16 of the water heater is flat and rectangular in form and has a central opening to receive the neck of the bottle 13.

A dispensing rack 15, embodying the invention, is provided for storing packets of concentrated food and beverages, cups, spoons, napkins and the like which are used in the preparation and consumption of individual servings prepared with the hot water obtained through the valve 14. The rack 15 comprises an annular base plate 17 which has a central opening 20 of a diameter to receive the water bottle 13 therethrough and includes four downwardly extending lugs 21, 22, 23 and 24 arranged to embrace the four sides of the body 12, respectively, when the plate rests on the top wall 16, and thereby align the opening 20 with the opening in the wall which receives the bottle 13.

A cylindrical skirt structure 25 is rotatably supported on the plate 17 by a roller bearing 26 which is comprised of lower and upper race plates 27, 30, which plates have aligned central openings 31, 32 respectively, which are of at least the same diameter as the opening 20. Annular grooves 33, 34 are formed in the plates 27, 30 adjacent the central openings 31, 32 and form a circular raceway containing a plurality of steel balls 35 which are of such diameter as to support the plate 30 slightly spaced from the plate 27 and provide anti-frictioning means to rotatably support the plate 30 on the plate 27. When the bearing 26 is assembled with the balls 35 in the grooves 33, 34 the inner edge portion 36 of the plate 27 is curled about the inner edge of the opening 32 through the plate 30 and overlies the edge of the opening to retain the race plates closely together while permitting relative rotation thereof.

The plate 27 is secured to plate 17 by four screws 37 and plate 30 rotates freely relative to the plate 17 about the axis of the openings 31, 32.

The top of the cylindrical structure 25 is comprised of a flat annular plate 40 having a downwardly extending peripheral flange, not shown, to which the upper end of an open ended sheet metal cylindrical member 41 is suitably secured. The annular plate 40 has four openings 42 therethrough which register with openings 43 in the bearing plate 30 and into which screws 44 are threaded to secure the plate 40 to the plate 30.

The cylindrical member 41 has a rectangular opening 45 in one side thereof so that when the plate 17 and the rack 15 are positioned on the body 12 of the water heater 10, the opening 45 will expose the water valve 14 when the opening is in registration therewith, as is shown in FIG. 1.

The cylindrical member 41 has a radially extending flange 46 attached about the bottom edge thereof, and a series of dispensers 47, in the form of vertically arranged semi-cylindrical members, have the closed sides thereof attached to the cylinder 41 and the open outer sides facing outwardly. The dispensers 47 are of a convenient diameter for receiving stacks of cup-like containers of concentrated instant coffee, soups and other beverages or foods which are commonly utilized in preparing beverages or foods from hot water such as that furnished by the device 10. A rectangular rack 50 is suitably secured to the outer side of member 41 for receiving packaged goods such as crackers or wafers and the like, and a cylindrical dispenser 51 is also attached to the cylinder 41 for dispensing disposable cups. The cup dispenser 51 may be of the well known type having a vertical slot 52 in which a cup lifter, including a handle 53, may be moved to raise the stacked cups in the dispenser above the top edge thereof for access to the topmost cup. In the form shown, a coin box 58 is also attached to the structure 41 by which users may deposit coins to pay for the material used. Also a rectangular, open top container 54 is attached to the cylinder 41 for supplying napkins, stirring spoons and the like.

It will be seen that the cylindrical structure 41 carrying the dispensers 50, 51, 54 can be revolved to bring to the user's convenient reach any of the stored items desired for preparing servings. For convenience, a knob 56 is rotatably attached to the upper plate 40 by which the structure 25 can be rotated to bring into ready access of the user any of the dispensing racks 50, 51 and 54.

Another form of the invention is shown in FIGS. 6 through 8 in which dispensing rack 60 is shown supported on a conventional coffee urn 61 which may be a twenty-five cup capacity. The urn comprises a base 62 and a pot 63 on which the rack 60 is rotatably supported. The urn includes a conventional spigot and valve 64 at the bottom of the pot and extending from the base over a drip pan 65.

The rack 60 comprises a lid or cover 66 for the pot 63 which has a circular flange 67 adapted to fit inside the open top edges of the pot 63 and center the lid thereon in the usual fashion. The cover 66 has a bearing 70 attached thereto which is like bearing 26 and like parts are designated by the reference characters having a prime suffix. The lower race plate 27' of the bearing 70 is attached to the lid 66 by suitable means, not shown, and the top race plate 30' of the bearing has the top end wall 71 of an open bottom sheet metal cylinder 72 attached thereto over which a top plate 73 is secured.

The sheet metal cylinder 72 is opened at the bottom to receive the sides of the urn 61 therein, and the outer sides carry suitable dispensing racks 78 attached thereto which may be similar to those described with reference to the dispensing rack 15. These racks are above a radially extending flange 74 adjacent the bottom of the cylinder 72.

The plate 73 has a central stack-like cup dispenser 75 secured thereto which has a vertically extending slot 76 therein through which a cup raiser 77 projects so that a stack of inverted cups within the dispenser 75 can be raised to the top where they may be taken individually by the user.

Preferably, a handle 80 is attached to the top plate 73 by which the dispenser can be rotated for convenient selection of the article desired by the user.

It will be noted that the vertical dispensers terminate short of the water valve 64 so that the user can have access to the dispensing valve 64 at all times.

It will be seen that by my invention food and article dispenser racks are provided which can be readily attached to water heating devices and which support a number of annularly arranged dispensing devices which can be conveniently brought to a position of access.

Although but two forms of the invention have been shown, it is apparent that other forms, modifications and adaptations could be used all falling within the scope of the claims which follow.

I claim:

1. A dispensing apparatus for use with an upright liquid container structure having a liquid valve in one side of the container structure, a first plate for extending across the top of the container structure and adapted to rest on the container structure, said plate including depending lugs for engaging spaced portions of the upper edges of the sides of the container structure to prevent lateral displacement of said plate relative to the structure, a second plate overlying said first plate and having a skirt member projecting from about the edges thereof downwardly alongside the structure, said skirt member having outwardly extending article support means at the lower end portion thereof, and bearing means between said first and second plates and supporting said second plate and skirt member for rotation about the axis of the container structure and relative to said first plate.

2. A dispensing apparatus as defined in claim 1 further characterized by said skirt member having an aperture therein whereby a valve located in the side of the container structure is accessible through said aperture when said second plate is rotated to a predetermined angle.

3. A dispensing apparatus as set forth in claim 1 further characterized by said first plate comprising a lid for the container and having a circular flange adapted to extend downwardly along the side edges of an opening in the top of the container.

References Cited

UNITED STATES PATENTS

| 1,382,092 | 6/1921 | Kilmer | 312—97.1 XR |
| 1,428,275 | 9/1922 | Dahl | 211—144 |
| 2,052,801 | 9/1936 | Russakov | 211—77 |
| 2,070,055 | 2/1937 | Levien | 211—77 |
| 2,365,995 | 12/1944 | Baker | 312—97.1 |
| 2,431,837 | 12/1947 | Spotts | 211—77 |
| 2,662,644 | 12/1953 | Alexander | 211—77 |
| 2,672,741 | 3/1954 | Bernhardt | 211—78 XR |
| 2,732,098 | 1/1956 | Lime | 221—104 XR |
| 3,275,159 | 9/1966 | James | 211—78 XR |
| 3,331,515 | 7/1967 | Lange | 211—77 |

CHANCELLOR E. HARRIS, Primary Examiner.

A. FRANKEL, Assistant Examiner.

U.S. Cl. X.R.

211—165,78,131; 312—97.1